(12) United States Patent
Shiraishi

(10) Patent No.: US 8,978,514 B2
(45) Date of Patent: Mar. 17, 2015

(54) BICYCLE FRONT SPROCKET

(75) Inventor: Shingo Shiraishi, Osaka (JP)

(73) Assignee: Shimano Inc., Osaka (JP)

( * ) Notice: Subject to any disclaimer, the term of this patent is extended or adjusted under 35 U.S.C. 154(b) by 67 days.

(21) Appl. No.: 13/545,493

(22) Filed: Jul. 10, 2012

(65) Prior Publication Data

US 2014/0013900 A1    Jan. 16, 2014

(51) Int. Cl.
*B62M 3/00* (2006.01)
*B62M 9/10* (2006.01)

(52) U.S. Cl.
CPC ............ *B62M 9/105* (2013.01); *Y10T 74/2165* (2015.01)
USPC ....................................... 74/594.2

(58) Field of Classification Search
USPC .................. 74/594.2; 474/152, 155, 160
See application file for complete search history.

(56) References Cited

U.S. PATENT DOCUMENTS

| | | | |
|---|---|---|---|
| 5,085,620 A * | 2/1992 | Nagano | 474/152 |
| 5,192,248 A | 3/1993 | Nagano | |
| 5,545,096 A * | 8/1996 | Su | 474/160 |
| 5,738,603 A * | 4/1998 | Schmidt et al. | 474/158 |
| 6,007,442 A * | 12/1999 | Schmidt | 474/122 |
| 6,045,472 A * | 4/2000 | Sung et al. | 474/160 |
| 8,096,908 B2 | 1/2012 | Oishi et al. | |
| 2004/0043855 A1 * | 3/2004 | Wei | 474/160 |
| 2005/0282671 A1 | 12/2005 | Emura et al. | |
| 2007/0135250 A1 * | 6/2007 | Kamada | 474/160 |

FOREIGN PATENT DOCUMENTS

| | | |
|---|---|---|
| EP | 1767449 A | 3/2007 |
| TW | 330546 | 4/1998 |

* cited by examiner

*Primary Examiner* — Vicky Johnson
(74) *Attorney, Agent, or Firm* — Global IP Counselors

(57) ABSTRACT

A bicycle front sprocket has a sprocket body and a chain engagement structure. The sprocket body has a center rotational axis, a first side surface and a second side surface. The second side surface is a smaller sprocket facing side. The chain engagement structure is disposed on an outer periphery of the sprocket body. The chain engagement structure includes a plurality of sprocket teeth extending radially outward from the outer periphery of the sprocket body. The sprocket teeth include at least one first tooth having a first tooth top with a first leading edge and a first trailing edge. The first leading edge is positioned downstream from the first trailing edge with respect to the driving-rotational direction of the bicycle sprocket. The first tooth top is shaped so that the first leading edge is positioned closer to the first side surface than the first trailing edge in the axial direction.

16 Claims, 7 Drawing Sheets

US 8,978,514 B2

BICYCLE FRONT SPROCKET

BACKGROUND

1. Field of the Invention

This invention generally relates to a front sprocket for a bicycle drivetrain. More specifically, the present invention relates to a bicycle front sprocket that is preferably part of a bicycle crank assembly of a bicycle drivetrain.

2. Background Information

In a multi-speed bicycle, a bicycle drivetrain typically includes a front crankset (e.g., a bicycle crank assembly), a rear gear cassette (e.g., a bicycle rear sprocket assembly) and a drive chain that connects the front crankset to the rear gear cassette. The crankset is rotatably supported to the bicycle frame by the bottom bracket. The crankset converts the pedaling motion of the rider's into rotational motion. This rotational motion of the crankset drives the drive chain, which in turn drives the rear gear cassette to rotate the rear wheel. The crankset includes one or more front sprockets. The crankset typically has two or three sprockets with the smallest sprocket being closest to the bicycle frame and the largest being located the farthest from the bicycle frame. These front sprockets are also often called chainrings or chainwheels. The rear gear cassette includes one or more rear sprockets with the smallest sprocket being farthest from the bicycle frame and the largest being located the closest to the bicycle frame. Front and rear derailleurs are arranged to force or shift the chain laterally between the various front and rear sprockets, respectively.

SUMMARY

Generally, the present disclosure is directed to various features of a bicycle front sprocket that aid in shifting a chain from a larger sprocket to a smaller sprocket. In one feature, a bicycle front sprocket is provided in which at least one tooth is configured that facilitates a smooth shifting action from the larger sprocket to the smaller sprocket.

In view of the state of the known technology, a bicycle front sprocket comprises a sprocket body and a chain engagement structure. The sprocket body has a center rotational axis, a first side surface and a second side surface. The first and second side surfaces face in opposite axial directions of the bicycle sprocket. The second side surface is a smaller sprocket facing side. The chain engagement structure is disposed on an outer periphery of the sprocket body. The chain engagement structure includes a plurality of sprocket teeth extending radially outward from the outer periphery of the sprocket body. The sprocket teeth include at least one first tooth having a first tooth top with a first leading edge and a first trailing edge. The first leading edge is positioned downstream from the first trailing edge with respect to the driving-rotational direction of the bicycle sprocket. The first tooth top is shaped so that the first leading edge is positioned closer to the first side surface than the first trailing edge in the axial direction.

Other objects, features, aspects and advantages of the disclosed bicycle sprocket will become apparent to those skilled in the art from the following detailed description, which, taken in conjunction with the annexed drawings, discloses one preferred embodiment of the bicycle sprocket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
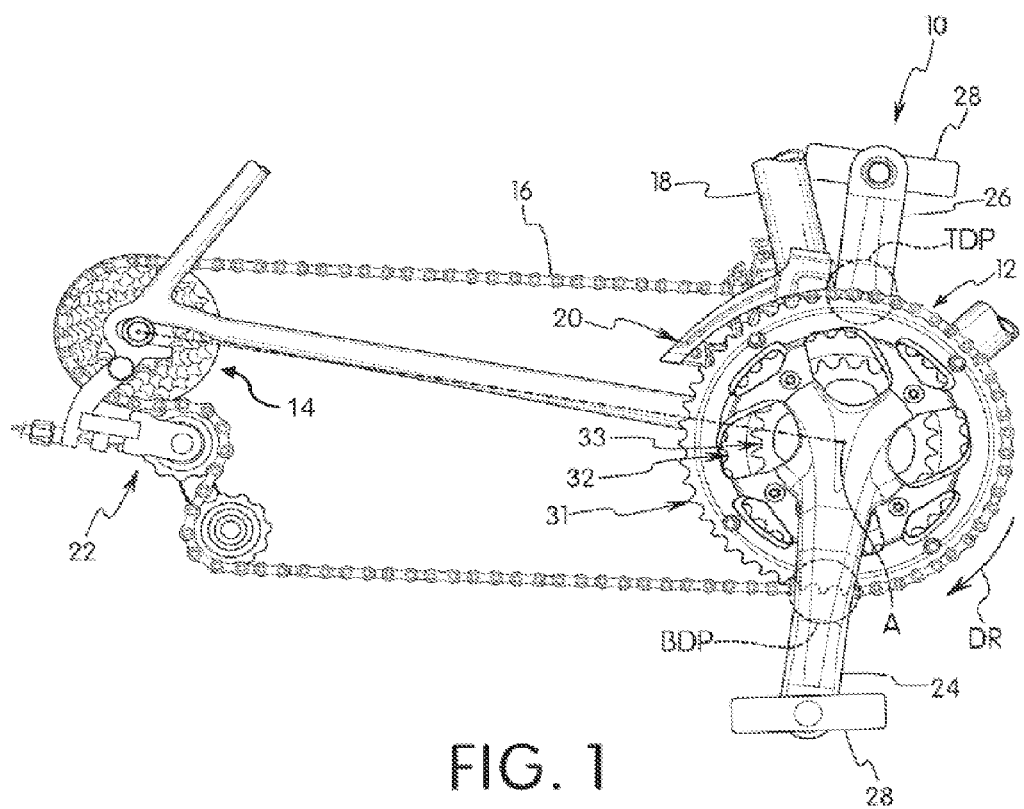
FIG. 1 is a side elevational view of a bicycle drive train having a front bicycle crank assembly in accordance with one preferred embodiment.

Referring initially to FIG. 1, a bicycle drivetrain 10 is illustrated with a front crankset 12 (e.g., a bicycle crank assembly) in accordance with one illustrative embodiment. The bicycle drivetrain 10 further includes a rear gear cassette 14 and a drive chain 16 that connects the front crankset 12 to the rear gear cassette 14. The front crankset 12 is rotatably supported to a bicycle frame 18 by a conventional bottom bracket in a conventional manner. The bicycle drivetrain 10 further includes a front derailleur 20 and a rear derailleur 22 for shifting the chain 16 laterally to change gears. The front and rear derailleurs 20 and 22 are operatively connected to shifters (not shown) for operating the front and rear derailleurs 20 and 22 in a conventional manner.

The bicycle drivetrain 10 is conventional, except for the front crankset 12 as discussed below. Thus, the bicycle drivetrain 10 will not be discussed and/or illustrated in detail herein, except as related to the present invention. Rather, it will be apparent to those skilled in the art from this disclosure that the bicycle drivetrain 10 includes various conventional bicycle components such as wheels, shifters, derailleurs, etc. coupled to the bicycle frame 18 in a conventional manner. Moreover, it will be apparent to those skilled in the art from this disclosure that various modifications can be made to the bicycle drivetrain 10 and its various components without departing from the present invention, as described and illustrated herein. Finally, it will be apparent to those skilled in the art from this disclosure that the bicycle drivetrain 10 can be used on various types of bicycle such as road or mountain bicycles as needed and/or desired.

Figure 2:
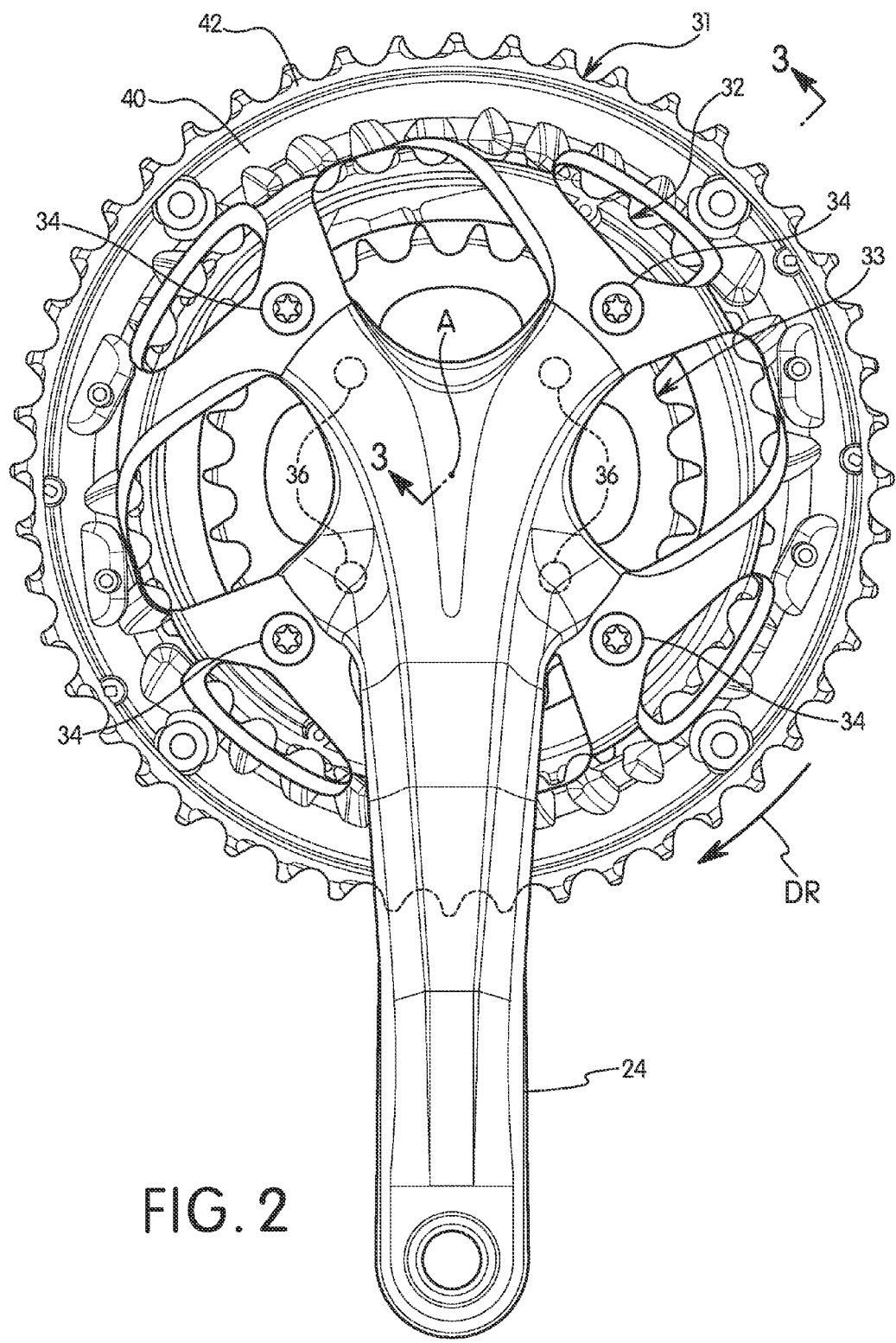
FIG. 2 is an enlarged, outside elevational view of the front bicycle crank assembly illustrated in FIG. 1.

The front crankset 12 includes a first crank arm 24 and a second crank arm 26. Each of the first and second crank arms 24 and 26 includes a pedal 28 that is mounted to the free end of a respective one of the first and second crank arms 24 and 26. The first and second crank arms 24 and 26 have inner ends fixed to opposite ends a crank axle 30 (FIG. 3), with the first and second crank arms 24 and 26 extending in opposite radial directions from the crank axle 30. The front crankset 12 further includes a large (first) bicycle front sprocket 31, a middle (second) bicycle front sprocket 32 and a small (third) bicycle front sprocket 33. The bicycle sprockets 31 to 33 are mounted to the first crank arm 24 such that the bicycle sprockets 31 to 33 have a top dead point TDP and a bottom dead point BDP with respect to the first crank arm 24. As seen in FIG. 2, the top dead point TDP and the bottom dead point BDP are 180 degrees apart with the bottom dead point BDP being aligned with the firs crank arm 24. As used herein, the term "bottom dead point" refers to the point along the bicycle sprockets 31 to 33 which correspond to a bottom of the downward portion of the pedaling motion (i.e., the bottom transition point between the downward portion of the pedaling motion and the upward portion of the pedaling motion).

The large bicycle sprocket 31 is located the farthest from the bicycle frame 18, while the small bicycle sprocket 33 is located the closest to the bicycle frame 18. The diameter of the large bicycle sprocket 31 is larger than the diameter of the middle bicycle sprocket 32, and the diameter of the middle bicycle sprocket 32 is larger than the diameter of the small bicycle sprocket 33. Also the number of teeth of the large bicycle sprocket 31 is greater than the number of teeth of the middle bicycle sprocket 32, and the number of teeth of the middle bicycle sprocket 32 is greater than the number of teeth of the small bicycle sprocket 33. Thus, the front crankset 12 converts the pedaling motion of the rider's into rotational motion (i.e., rotating in a driving-rotational direction DR). In particular, this rotational motion of the front crankset 12 in the driving-rotational direction DR drives the drive chain 16 via one of the bicycle sprockets 31 to 33, which in turn drives the rear gear cassette 14 to rotate a rear wheel (not shown). As used herein, the term "upstream side" of the sprocket teeth of the bicycle sprockets 31 to 33 refers to a location in an opposite direction from that of the driving-rotational direction DR with respect to a reference location. As used herein, the term ""downstream side" of the sprocket teeth of the bicycle sprockets 31 to 33 refers to a location in the direction of the driving-rotational direction DR with respect to a reference location.

Figure 3:
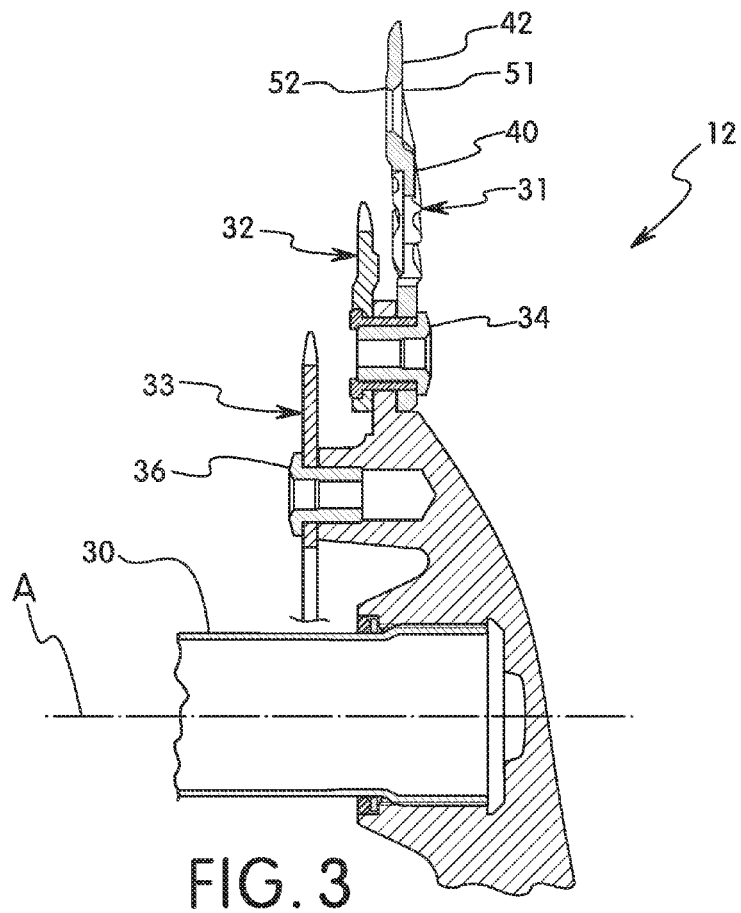
FIG. 3 is an enlarged, partial cross sectional view of the front bicycle crank assembly illustrated in FIGS. 1 and 2 as seen along section line 3-3 of FIG. 2.

As seen in FIGS. 2 and 3, the large and middle bicycle sprockets 31 and 32 are fixed to the first crank arm 24 by a plurality of first fasteners 34, and the small sprocket 33 is fixed to the first crank arm 24 by a plurality of second fasteners 36. The bicycle sprockets 31 to 33 are hard, rigid disc shaped members formed from a suitable material such as a metallic material. The bicycle sprockets 31 and 32 are unidirectional sprockets to be installed in only single way. In other words, the teeth of the bicycle sprockets 31 and 32 are designed to have particular configurations such that the bicycle sprockets 31 and 32 will not function properly if mounted backwards. Preferably, the mounting portions of the bicycle sprockets 31 and 32 are configured relative to the mounting portions of the crank arm 24 such that the bicycle sprockets 31 and 32 cannot be mounted backwards. In the illustrated embodiment, the bicycle sprockets 31 to 33 are each one-piece, unitary members formed of a metallic material that is suitable for a bicycle sprocket. In the illustrated embodiment, the bicycle sprockets 31 to 33 basically only differ in their overall diameter, number of teeth, the size of weight reducing openings (if any) in the sprocket body and the use of chain shifting assist features. The sprocket 33 differs from the bicycle sprockets 31 and 32 in that the bicycle sprocket 33 does not include any chain shifting assist features and all of the teeth of the bicycle sprocket 33 are straight teeth. The large and middle bicycle sprockets 31 and 32, on the other hand, have various chain shifting assist features, and the teeth are not all the same.

While the front crankset 12 includes three bicycle sprockets, it will be apparent to those skilled in the bicycle field that the front crankset 12 can be configured with only two sprockets if needed and/or desired. As mentioned above, the large and middle bicycle sprockets 31 and 32 are both provided with various chain shifting assist features to aid to facilitate shifting of the chain 16 between the bicycle sprockets 31 to 33. The same chain shifting assist features are used on both the large and middle bicycle sprockets 31 and 32. Thus, only the chain shifting assist features of the large bicycle sprocket 31 will be discussed herein for the sake of brevity. Downshifting as used herein means shifting from a larger front sprocket to a smaller front sprocket so as to decrease gear ratio. On the other hand, upshifting as used herein means shifting from a smaller front sprocket to a front larger sprocket so as to increase gear ratio.

Referring to FIGS. 5 to 8, the large bicycle sprocket 31 includes a sprocket body 40 and a chain engagement structure 42 that is defined by a plurality of sprocket teeth. The sprocket body 40 is disposed radially inward of the chain engagement structure 42. The sprocket body 40 defines an inner peripheral edge 44 of the large bicycle sprocket 31, while the chain engagement structure 42 defines an outer peripheral edge 46 of the large bicycle sprocket 31. The inner peripheral edge 44 includes four crank mounting parts 48. Each of the crank mounting parts 48 has a mounting opening 48a that receives one of the first fasteners 34 therethrough for fixing the large bicycle sprocket 31 to the first crank arm 24.

Figure 4:
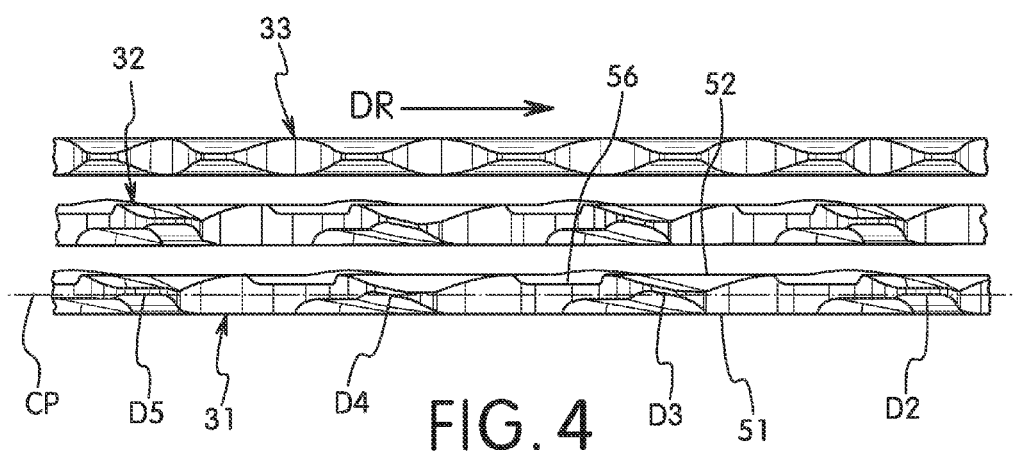
FIG. 4 is a partial top plan view of the front chainrings (i.e., the front sprockets) of the front bicycle crank assembly illustrated in FIGS. 1 to 3.
Figure 5:
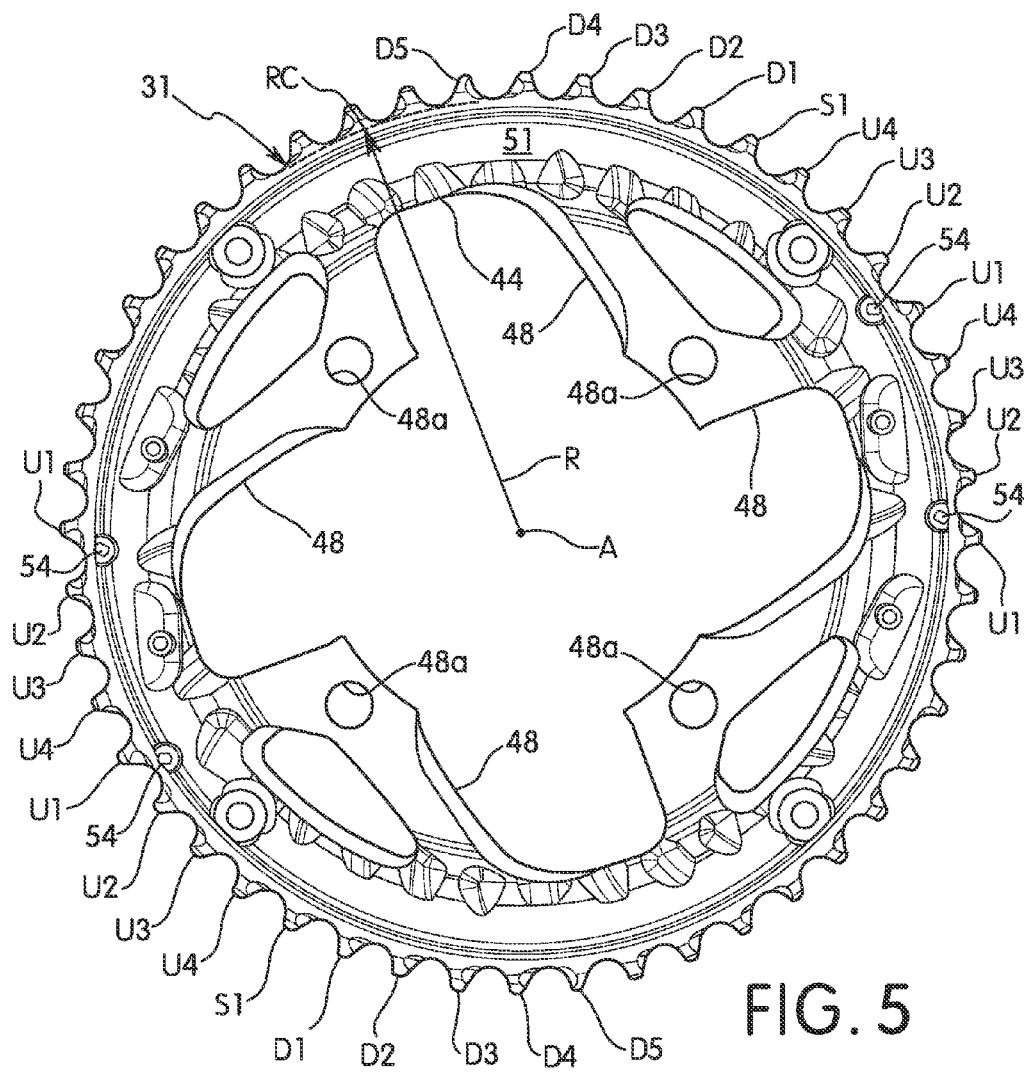
FIG. 5 is an outside elevational view of the large bicycle front sprocket illustrated in FIG. 2.
Figure 6:
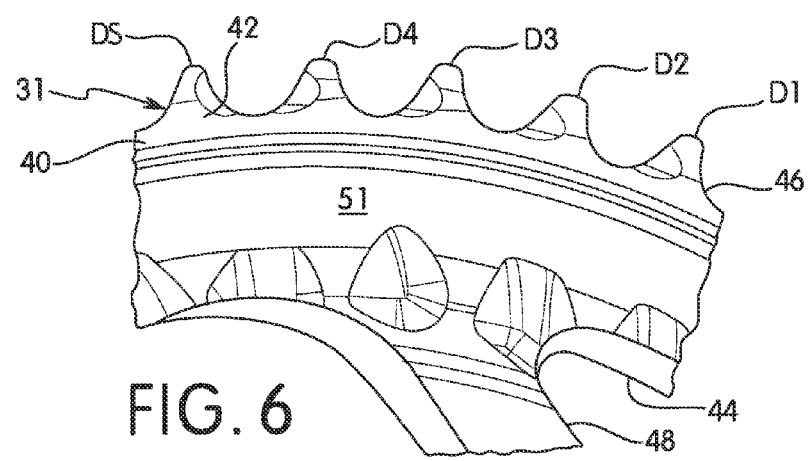
FIG. 6 is an enlarged, partial elevational view of a portion of the large bicycle front sprocket illustrated in FIG. 5.
Figure 7:
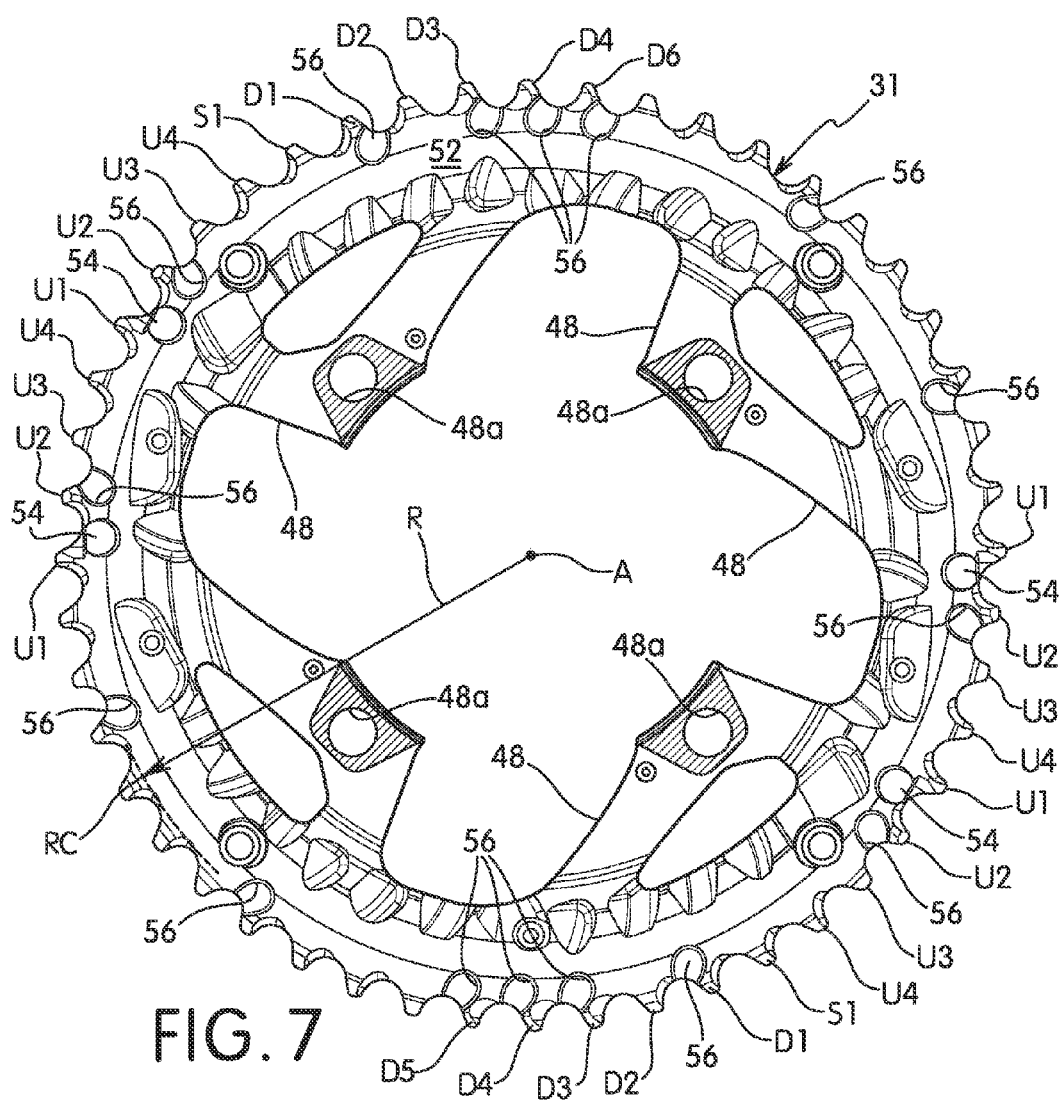
FIG. 7 is an inside elevational view of the large bicycle front sprocket illustrated in FIG. 5.
Figure 8:
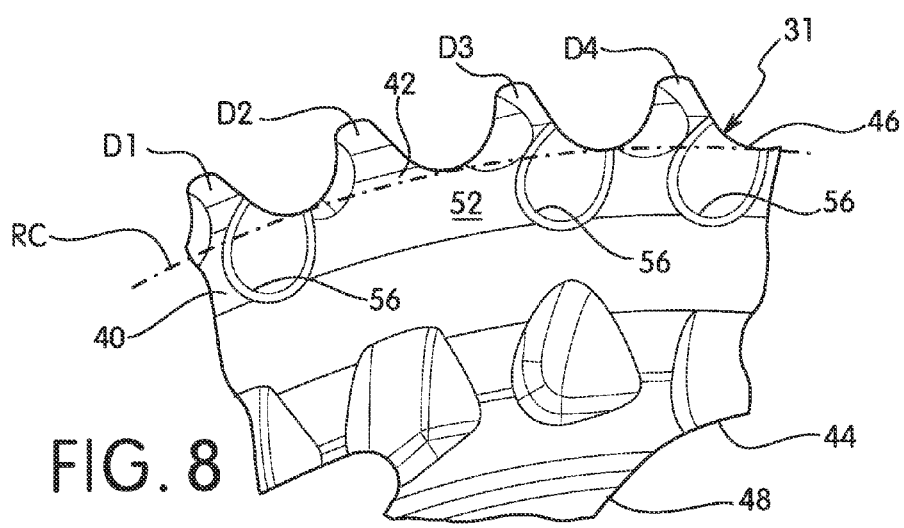
FIG. 8 is an enlarged, partial elevational view of a portion of the large bicycle front sprocket illustrated in FIG. 7.
Figure 9:
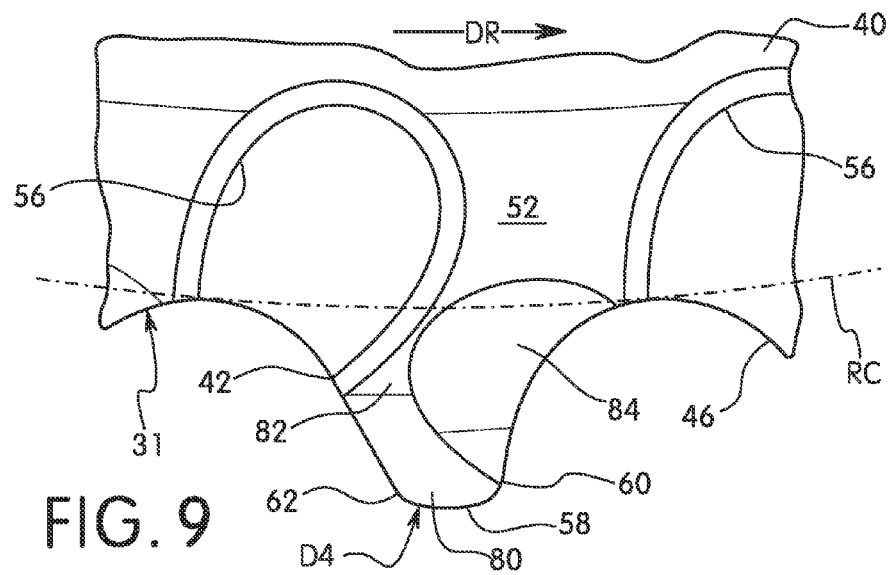
FIG. 9 is an enlarged, partial elevational view of the inside surface of a first tooth of the downshift teeth of the large bicycle front sprocket illustrated in FIG. 5.

As seen in FIG. 4, the large bicycle sprocket 31 has a first side surface 51 and a second side surface 52. The first and second side surfaces 51 and 52 face in opposite axial directions of the large bicycle sprocket 31. The first side surface 51 is a crank arm facing side that faces away from the bicycle frame 18, and faces toward the first crank arm 24. The second side surface 52 is a smaller sprocket facing side that faces away from the first crank arm 24, and faces toward the bicycle frame 18. A center sprocket plane CP is defined by an axial midpoint between first and second side surfaces 51 and 52 at the outer periphery of the sprocket body 40. A root circle RC of the sprocket teeth of the large bicycle sprocket 31 defines the dividing line between the sprocket body 40 and the chain engagement structure 42. The root circle RC is a hypothetical circle that is defined at the bottom of the tooth spaces between the sprocket teeth of the large bicycle sprocket 31. The root circle RC has a radius R from the center rotational axis A.

The sprocket body 40 is provided with four upshift projections 54, which are used to engage the chain 16 to aid in shifting the chain 16 from the middle bicycle sprocket 32 to the large bicycle sprocket 31 during an upshifting operation. The upshift projections 54 protrude in an axial direction from the second side surface 52 toward the middle bicycle sprocket 32. The upshift projections 54 are currently used in some of the front cranksets that are sold by Shimano Inc. The upshift projections 54 project from the second side surface 52 including at least one upshift projection that is disposed adjacent the root circle RC of the sprocket teeth of the large bicycle sprocket 31. The second side surface 52 of the sprocket body 40 also includes a plurality of recesses 56. The recesses 56 are disposed at the root circle RC of the sprocket teeth for aiding in shifting the chain 16. Recesses that are similar to the recesses 56 are currently used in some of the front cranksets that are sold by Shimano Inc.

The chain engagement structure 42 is disposed along an outer periphery of the sprocket body 40 to define the outer peripheral edge 46 of the large bicycle sprocket 31. The chain engagement structure 42 includes a plurality of sprocket teeth extending radially outward from the outer periphery of the sprocket body 40 for engaging the chain 16. The sprocket teeth of the large bicycle sprocket 31 have a variety of shapes. However, only the sprocket teeth of the large bicycle sprocket 31 that are primarily used for shifting the chain 16 from the large bicycle sprocket 31 toward the middle bicycle sprocket 32 will be mentioned herein.

The sprocket teeth of the large bicycle sprocket 31 are configured and arranged with respect the upshift projections 54 to create four upshift zones that equally spaced apart in a circumferential direction of the chain engagement structure 42. Each of the upshift zones are defined by four consecutive upshift teeth U1, U2, U3 and U4. These upshift teeth U1 to U4 cooperate with the upshift projections 54 to shift the chain 16 from the middle bicycle sprocket 32 to the large bicycle sprocket 31 during an upshift operation by the front derailleur 20. During such an upshift operation, one of the upshift projections 54 engages the chain 16 to lift the chain 16 onto the upshift teeth U1 to U4 of the large bicycle sprocket 31. The configuration of the upshift teeth U1 to U4 can be conventional upshift teeth such as those used in some of the front cranksets that are sold by Shimano Inc. Thus, the configuration of the upshift teeth U1 to U4 will not be discussed and/or illustrated herein.

The sprocket teeth of the large bicycle sprocket 31 are also configured and arranged to create two downshift zones. Each of the downshift zones are defined by five consecutive downshift teeth D1, D2, D3, D4 and D5. These downshift teeth D1 to D5 cooperate with the recesses 56 to shift the chain 16 from the large bicycle sprocket 31 to the middle bicycle sprocket 32 during a downshift operation by the front derailleur 20. The downshift teeth D1 to D5 of each of the downshift zones are circumferentially spaced approximately 180 degrees apart from each corresponding tooth. For each downshift zones, the downshift tooth D1 is spaced from one of the upshift teeth U4 by a single sprocket tooth S1. The sprocket tooth S1 is located at the upstream side of the downshift teeth D1 to D5 and the downstream side of the upshift teeth U1 to U4 with respect to the driving-rotational direction DR. The sprocket teeth S1 have tooth tips that are preferably straight (non-twisted) tooth tips and that are parallel to the sprocket center plane CP. The sprocket teeth S1 are preferably offset toward the second side surface 52.

Each of the downshift teeth D1, D3, D4 and D5 has one of the recesses 56, which is formed in the second side surface 52 of the sprocket body 40, extending along a base portion that is disposed at the root circle RC. The recesses 56 are located at the upstream sides of the downshift teeth D1, D3, D4 and D5. The downshift teeth D1, D2 and D5 have tooth tips that are preferably straight (non-twisted) tooth tips and that are parallel to the sprocket center plane CP. Preferably, the downshift teeth D1, D2 and D5 are offset toward the second side surface 52 as seen in FIG. 4. The sprocket teeth S1 and the downshift teeth D1, D2 and D5 are conventional straight teeth. The downshift teeth D3 and D4 have tooth tips that are twisted tooth tips and that are non-parallel to the sprocket center plane CP.

The follow descriptions will now focus on the downshift teeth D3 and D4. While the downshift teeth D3 and D4 are not exactly identical (e.g., the location of the tooth tips with respect to the sprocket center plane CP are slightly different), the downshift teeth D3 and D4 include all of the same features and the overall shapes appear the same. Thus, for the sake of brevity, only one of the downshift tooth D4 will be illustrated and described in more detail. It will be apparent that the illustrations and descriptions of the downshift tooth D4 applies to the downshift teeth D3, except that the tooth tips of the downshift teeth D3 are shifted slightly in the axial direction toward the second side surface 52 as seen in FIG. 4. Also for the sake of brevity and easy of describing the downshift teeth D3 and D4, the downshift teeth D4 are considered to be first teeth and the downshift teeth D3 are considered to be second teeth of the downshift teeth D1 to D5. Moreover, the downshift teeth D3 and D4 of one of the downshift zones define a first set of the first and second teeth, while the other of the downshift zones defines a second set of the first and second teeth. The first and second sets of the downshift teeth D3 and D4 are circumferentially spaced approximately 180 degrees apart. For each of the downshifting zone, the downshift teeth D3 (i.e., the second teeth) and the downshift teeth D4 (i.e., the first teeth) are positioned in a vicinity of the top dead point TDP and a vicinity of the bottom dead point BDP with respect to the first crank arm 24. Of course, if there is only one downshifting zone, then the downshift teeth D3 and the downshift teeth D4 are positioned in the vicinity of one of the top dead point TDP and the bottom dead point BDP with respect to the crank arm 24.

Figure 10:
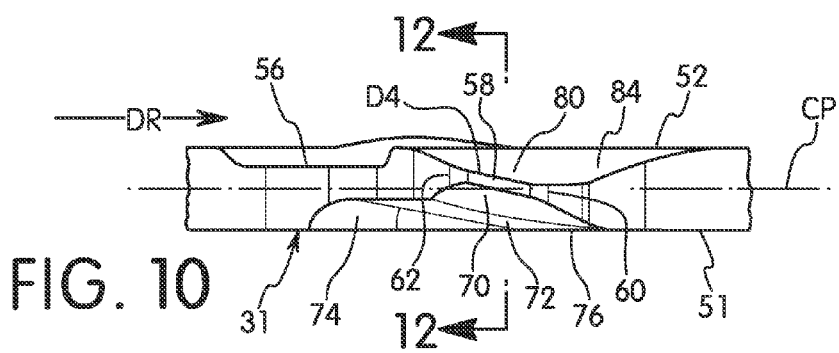
FIG. 10 is an enlarged, partial top plan view of the downshift tooth of the large bicycle front sprocket illustrated in FIG. 9.
Figure 11:
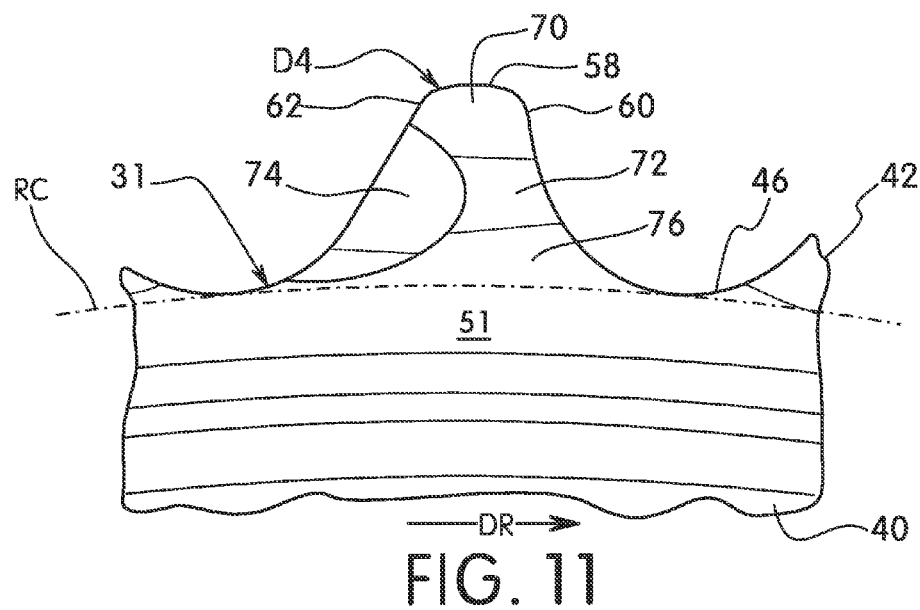
FIG. 11 is an enlarged, partial elevational view of the outside surface of the downshift tooth of the large bicycle front sprocket illustrated in FIGS. 9 and 10.
Figure 12:
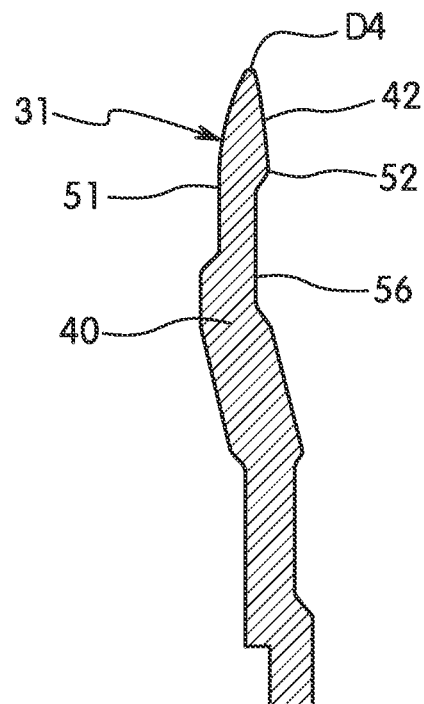
FIG. 12 is a partial cross sectional view of the downshift tooth of the large bicycle front sprocket illustrated in FIGS. 9 to 11 as seen along section line 12-12 of FIG. 10.

Referring now to FIGS. 9 to 12, the downshift tooth D4 is shown in more detail. The downshift tooth D4 includes a first tooth top 58 with a first leading edge 60 and a first trailing edge 62. As used herein, the term "tooth top" of a tooth refers to a top surface of a tooth that is bounded by inflection points and/or distinct edges between two surfaces. The terms "leading" and "trailing" as used herein refer to locations with respect to the driving rotational direction DR. Thus, the first leading edge 60 is positioned downstream from the first trailing edge 62 with respect to the driving rotational direction DR of the large bicycle sprocket 31. The first tooth top 58 is shaped so that the first leading edge 60 is positioned closer to the first side surface 51 than the first trailing edge 62 in the axial direction of the large bicycle sprocket 31. The first leading edge 60 and the first trailing edge 62 of the first tooth top 58 are at least partially located on opposite axial sides of the center sprocket plane CP in a preferable embodiment. As seen in FIG. 10, the first trailing edge 62 is completely located on the axial side of the center sprocket plane CP that includes the second side surface 52. On the other hand, the first leading edge 60 straddles the center sprocket plane CP such that a part of the first leading edge 60 lies on each of the axial sides of the center sprocket plane CP.

As seen in FIGS. 9 to 12, the first side surface 51 of the downshift tooth D4 includes an outer tapered (inclined) surface 70, an inner tapered (inclined) surface 72 and a trailing curved surface 74. The outer tapered surface 70 extends from a side edge of the first tooth top 58 to the inner tapered surface 72. The inner tapered surface 72 is steeper than the outer tapered surface 70 with respect to the center sprocket plane CP. The inner tapered surface 72 extends from the outer tapered surface 70 to a non-tapered surface 76 that extends across the root circle RC to the sprocket body 40. The trailing curved surface 74 extends radially along the trailing edges of the surfaces 70, 72 and 76. The trailing curved surface 74 circumferentially slopes towards the center sprocket plane CP in an upstream direction, and radially slopes away the center sprocket plane CP. The second side surface 52 includes an outer tapered (inclined) surface 80, a non-tapered surface 82 and a leading curved surface 84. The outer tapered surfaces 70 and 80 tapers from opposite axial sides of the first tooth top 58 toward the root circle RC of the sprocket teeth with respect to the center sprocket plane CP. The outer tapered surface 80 is steeper than the outer tapered surface 70 with respect to the center sprocket plane CP. The non-tapered surface 82 is parallel to the center sprocket plane CP. The trailing curved surface 84 extends radially along the trailing edges of the surfaces 80 and 82. The trailing curved surface 84 circumferentially slopes towards the center sprocket plane CP in an upstream direction, and radially slopes away the center sprocket plane CP.

Figure 13:
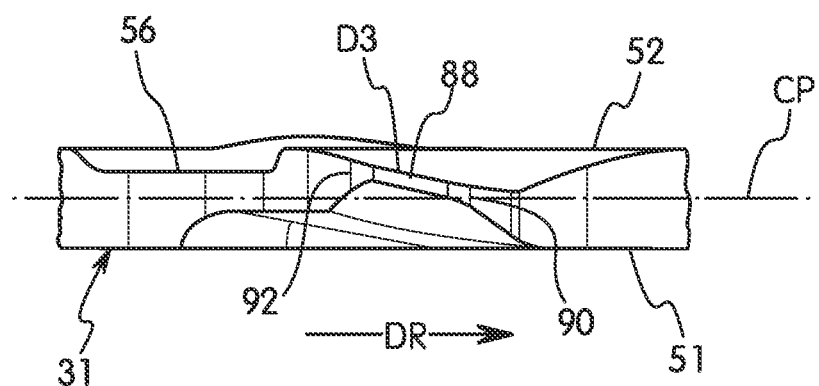
FIG. 13 is an enlarged, partial top plan view of a second tooth of the downshift teeth of the large bicycle front sprocket.

Referring to FIG. 13, the first side surface 51 of the downshift tooth D3 includes a second tooth top 88 with a second leading edge 90 and a second trailing edge 92. The second leading edge 90 is positioned downstream from the second trailing edge 62 with respect to the driving rotational direction DR of the large bicycle sprocket 31. The second tooth top 88 is shaped so that the second leading edge 90 is positioned closer to the first side surface 51 than the second trailing edge 92 in the axial direction of the large bicycle sprocket 31. The second leading edge 90 and the second trailing edge 92 of the second tooth top 88 are at least partially located on opposite axial sides of the center sprocket plane CP in a preferable embodiment. As seen in FIG. 13, the second trailing edge 92 is completely located on the axial side of the center sprocket plane CP that includes the second side surface 52. On the other hand, the second leading edge 90 straddles the center sprocket plane CP such that a part of the second leading edge 90 lies on each of the axial sides of the center sprocket plane CP. In the illustrated embodiment, the second tooth top 88 is twisted to the same degree as the first tooth top 58. However, the second tooth top 88 is shifted slightly more toward the second side surface 52 than the first tooth top 58. Preferably, the downshift tooth D3 includes the same surfaces of the downshift tooth D4, but with some minor differences as needed and/or desired.

With the downshift teeth D3 and D4 have the twisted arrangement, as discussed above, the chain 16 can be more easily downshifted from the large bicycle sprocket 31 to the middle bicycle sprocket 32 during a downshift operation because the leading edges 60 and 90 are positioned closer to the first side surface 51 than conventional teeth. Also with the downshift teeth D3 and D4 have the twisted arrangement, as discussed above, the chain 16 will not easily disengage when the front crankset 12 is rotated in a counter driving-rotational direction because the trailing edges 62 and 92 are positioned closer to the second side surface 52 than conventional teeth.

It will be understood that although the terms first and second may be used herein to describe various components, these components should not be limited by these terms. These terms are only used to distinguish one component from another. Thus, for example, a first component discussed above could be termed a second component and vice-a-versa without departing from the teachings of the present invention. Also in understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. As used herein to describe the above embodiment(s), the following directional terms "forward", "rearward", "above", "downward", "vertical", "horizontal", "below" and "transverse" as well as any other similar directional terms refer to those directions of a bicycle equipped with the bicycle sprocket. Accordingly, these terms, as utilized to describe the bicycle sprocket should be interpreted relative to a bicycle equipped with the bicycle sprocket as used in the normal upright riding position on a level surface. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially change their intended purpose. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle front sprocket comprising:
  a sprocket body having a center rotational axis, a first side surface and a second side surface, the first and second side surfaces facing in opposite axial directions of the bicycle front sprocket, the second side surface being a smaller sprocket facing side; and
  a chain engagement structure disposed on an outer periphery of the sprocket body, the chain engagement structure including a plurality of sprocket teeth extending radially outward from the outer periphery of the sprocket body, the sprocket teeth including at least one first tooth having a first tooth top with a first leading edge and a first trailing edge, the first leading edge being positioned downstream from the first trailing edge with respect to the driving-rotational direction of the bicycle front sprocket, the first tooth top being shaped so that the first leading edge is positioned closer to the first side surface than the first trailing edge in the axial direction and so that the first leading edge and the first trailing edge extend along the axial direction of the bicycle front sprocket as viewed in a top plan view of the bicycle front sprocket, the first leading edge straddling a center sprocket plane that is defined by an axial midpoint between first and second side surfaces at the outer periphery of the sprocket body.

2. The bicycle front sprocket according to claim 1, wherein the sprocket teeth include at least one second tooth that is located adjacent the first tooth, the second tooth having a second tooth top with a second leading edge and a second trailing edge, the second leading edge being positioned downstream from the second trailing edge with respect to the driving-rotational direction of the bicycle sprocket, the second tooth top being shaped so that the second leading edge is positioned closer to the first side surface than the second trailing edge in the axial direction.

3. The bicycle crank assembly according to claim 2, wherein
the second leading edge and the second trailing edge of the at least one second tooth extend along the axial direction of the bicycle front sprocket as viewed in a top plan view of the bicycle front sprocket.

4. The bicycle front sprocket according to claim 2, wherein the sprocket teeth include a first set of the first and second teeth and a second set of the first and second teeth.

5. The bicycle front sprocket according to claim 4, wherein the first and second sets are circumferentially spaced approximately 180 degrees apart.

6. The bicycle front sprocket according to claim 1, wherein the first leading edge and the first trailing edge of the at least one first tooth are at least partially located on opposite axial sides of the center sprocket plane.

7. The bicycle front sprocket according to claim 1, wherein the second side surface of the sprocket body includes a recess that is disposed at a root circle of the sprocket teeth and that extend along a base portion of the at least one first tooth.

8. The bicycle front sprocket according to claim 1, wherein the second side surface includes at least one upshift projection that is disposed adjacent a root circle of the sprocket teeth.

9. A bicycle crank assembly including the bicycle front sprocket according to claim 1, and the bicycle crank assembly further comprising:
a crank arm having the bicycle sprocket is mounted thereon, the at least one first tooth being positioned in a vicinity of at least one of a top dead point and a bottom dead point with respect to the crank arm.

10. The bicycle crank assembly according to claim 9, wherein
the at least one first tooth is positioned in the vicinity of each of the top dead point and the bottom dead point with respect to the crank arm.

11. The bicycle crank assembly according to claim 9, wherein
the sprocket teeth include at least one second tooth that is located adjacent the first tooth, the second tooth having a second tooth top with a second leading edge and a second trailing edge, the second leading edge being positioned downstream from the second trailing edge with respect to the driving-rotational direction of the bicycle sprocket, the second tooth top being shaped so that the second leading edge is positioned closer to the first side surface than the second trailing edge in the axial direction.

12. The bicycle crank assembly according to claim 11, wherein
the at least one first tooth and the at least one second tooth are positioned in the vicinity of at least one of the top dead point and the bottom dead point with respect to the crank arm.

13. The bicycle crank assembly according to claim 11, wherein
the sprocket teeth include a first set of the first and second teeth and a second set of the first and second teeth; and
at least one of the first and second sets is positioned in the vicinity of at least one of the top dead point and the bottom dead point with respect to the crank arm.

14. The bicycle crank assembly according to claim 13, wherein
the first and second sets are positioned in the vicinity of the top dead point and the vicinity of the bottom dead point with respect to the crank arm, respectively.

15. The bicycle front sprocket according to claim 1, wherein
the first trailing edge is disposed entirely on the axial side of the center sprocket plate that includes the second side surface.

16. A bicycle front sprocket comprising:
a sprocket body having a center rotational axis, a first side surface and a second side surface, the first and second side surfaces facing in opposite axial directions of the bicycle front sprocket, the second side surface being a smaller sprocket facing side; and
a chain engagement structure disposed on an outer periphery of the sprocket body, the chain engagement structure including a plurality of sprocket teeth extending radially outward from the outer periphery of the sprocket body, the sprocket teeth including at least one first tooth having a first tooth top with a first leading edge and a first trailing edge, the first leading edge being positioned downstream from the first trailing edge with respect to the driving-rotational direction of the bicycle front sprocket, the first tooth top being shaped so that the first leading edge is positioned closer to the first side surface than the first trailing edge in the axial direction,
the at least one first tooth has first and second tapered surfaces tapering from opposite axial sides of the first tooth top toward a root circle of the sprocket teeth, the second tapered surface being a smaller sprocket facing side of the at least one first tooth, the second tapered surface being steeper than the first tapered surface with respect to a center sprocket plane is defined by an axial midpoint between first and second side surfaces at the outer periphery of the sprocket body.

* * * * *